Figure 1:
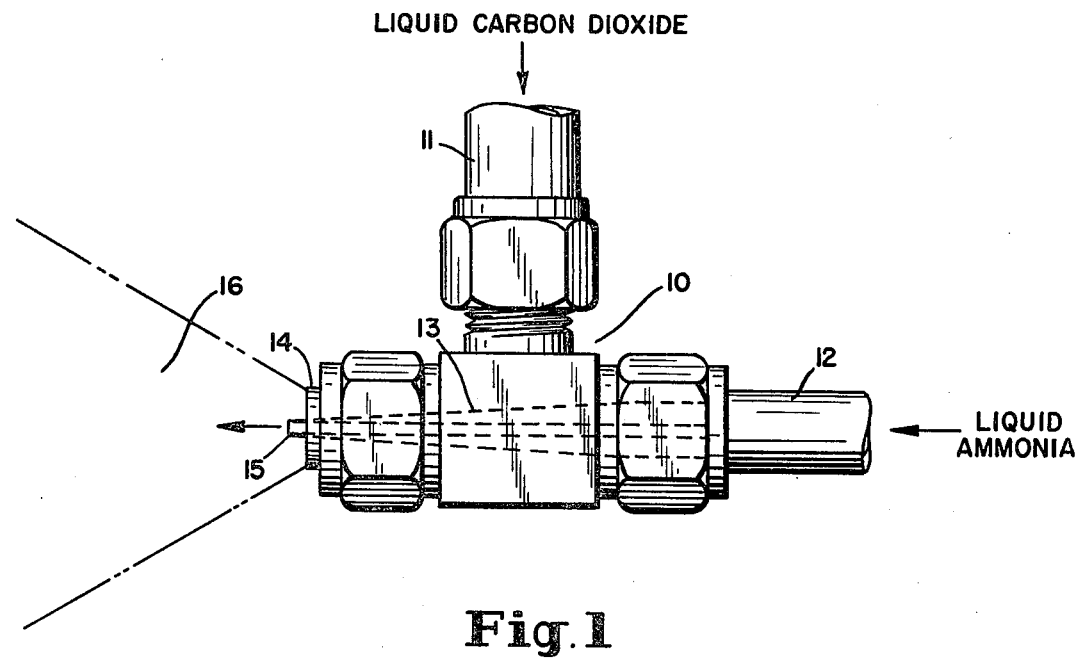

United States Patent [19]

Washington et al.

[11] 4,420,635
[45] Dec. 13, 1983

[54] AMMONIUM CARBAMATE PRODUCTION

[75] Inventors: James M. Washington, Richmond; Dale R. Fillenwarth, Ashland; Francis V. Utsch, Midlothian, all of Va.

[73] Assignee: Philip Morris Inc., New York, N.Y.

[21] Appl. No.: 177,291

[22] Filed: Aug. 11, 1980

[51] Int. Cl.³ .......................................... C07C 125/02
[52] U.S. Cl. .................................. 562/555; 239/424; 239/433
[58] Field of Search ....................................... 562/555

[56] References Cited

U.S. PATENT DOCUMENTS

| | | | |
|---|---|---|---|
| 1,344,673 | 6/1920 | Bosch | 562/555 |
| 2,194,082 | 3/1940 | Booth | 562/555 |
| 2,777,877 | 1/1957 | Fauser | 562/555 |
| 3,284,537 | 11/1966 | Webb | 562/555 |
| 3,816,528 | 6/1974 | Cook | 562/555 |

FOREIGN PATENT DOCUMENTS 1097430  1/1961  Fed. Rep. of Germany .
 730683  4/1980  U.S.S.R. .

OTHER PUBLICATIONS

Inorganic Synthesis, vol. 2 (1946), 85–86; Brooks et al. #23 Ammonium Carbamate.
Kirk–Othmer Encyclopedia of Chem. Tech., vol. 21 (1970) 40–41 "Urea Synthesis".
CA15:1499 C. Matignon et al., "The Dissociation of Ammonium Carbamate".
CA16:2628 C. Matignon et al., "Conditions Governing the Formation and Stability of Ammonium Carbamate".
CA16:2629 C. Matignon et al., "The Transformation of Ammonium Carbamate".
CA46:3835 "Reaction Between Ammonia and Carbon Dioxide Under High Pressure" Kiyama et al.
Considine, Douglas M. Chemical and Process Technology Encyclopedia (McGraw Hill, 1974), 1118–1121.

*Primary Examiner*—Michael L. Shippen
*Attorney, Agent, or Firm*—Arthur I. Palmer, Jr.; George E. Inskeep

[57] ABSTRACT

This invention provides a dispensing assembly which is adapted to deliver two separate instantaneously coreactive liquid streams into an external contacting zone. The two reactants do not make contact within the body of the dispensing assembly, which prevents solid product formation and clogging within the dispensing assembly nozzles.

The dispensing assembly is suitable for the coreaction of liquid carbon dioxide and liquid ammonia to produce free-flowing ammonium carbamate powder having a purity of substantially 100 percent.

3 Claims, 2 Drawing Figures

U.S. Patent

Dec. 13, 1983

4,420,635

AMMONIUM CARBAMATE PRODUCTION

BACKGROUND OF THE INVENTION

There has been continuing effort to develop new and improved expansion methods for increasing the filling capacity of tobacco. Numerous methods for expanding tobacco have been proposed. While some methods involve the use of heat, steam and/or pressure, freeze drying, and the like, others involve the use of various substances in gaseous, liquid or solid form, which are applied on or impregnated into the tobacco matrix, and thereafter the impregnated tobacco is subjected to heat whereby the tobacco is expanded. Illustrative of tobacco expansion technology are the disclosures of British Pat. No. 1,331,640 and U.S. Pat. No. 3,771,533 patents.

A recently proposed process for expanding tobacco involves applying finely powdered ammonium carbamate to cut tobacco, and after a holding period at ambient temperature and pressure for 4–24 hours, the tobacco matrix is heated to effect substantial expansion of the tobacco. Optimal results are dependent on the treatment of the cut tobacco with high purity ammonium carbamate, preferably in a finely powdered free-flowing form.

High purity ammonium carbamate in the form of a fine powder is not a commercially available product. Efforts to purify and grind commercial ammonium carbamate are inefficient and uneconomical, particularly since ammonium carbamate is sensitive to the presence of moisture. *Inorganic Syntheses*, 2, 85–86(1946) describes ammonium carbamate as slightly volatile at room temperature and completely dissociated at 138° F. It is very soluble in water but, in solution or on standing in moist air, it undergoes hydration to ammonium carbonate:

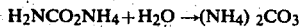

$$H_2NCO_2NH_4 + H_2O \rightarrow (NH_4)_2CO_3$$

It is known that ammonium carbamate can be formed by interacting carbon dioxide and ammonia in the form of gases and/or liquids and/or solids. Due to the strong exothermic heat of formation and the low temperature of decomposition of the product, a high yield of pure ammonium carbamate is not readily obtained in an economically practical manner.

German Auslegeschrift No. 1,097,430 (Jan. 19, 1961) proposes a process for improving the yield and purity of ammonium carbamate as prepared by the interaction of liquid carbon dioxide and liquid ammonia. Finely powdered ammonium carbamate is obtained by releasing the two liquid reactants from a mixing nozzle into a closed space, with one of the reactants being present in a stoichiometric excess.

In practice, the blending of liquid carbon dioxide and liquid ammonia in a mixing nozzle for spraying into an enclosed space involves difficulties which hamper a continuous mode of operation. First, clogging of lines is caused by ice formation due to the presence of moisture in the reactants. Second, there is periodic clogging of the mixing nozzle chamber and outlet, because upon contact of the carbon dioxide and ammonia there is instantaneous formation of particulate ammonium carbamate within the confines of the mixing nozzle.

There remains a need for improved apparatus and means for producing ammonium carbamate in an economically feasible manner.

Accordingly, it is an object of this invention to provide a novel dispensing assembly adapted for delivering two separate instantaneously coreactive liquid streams into an external contacting zone, which dispensing assembly can operate continuously over an extended period without internal clogging.

It is a further object of this invention to provide a process for producing free-flowing ammonium carbamate powder having a purity of substantially 100 percent.

Other objects and advantages of the present invention shall become apparent from the accompanying description and drawings.

DESCRIPTION OF THE INVENTION

One or more objects of the present invention are accomplished by the provision of a dispensing assembly adapted to deliver two pressurized coreactive liquid streams into an external contacting zone which comprises (1) a first tubular nozzle which is substantially circular in cross-section and extends to a discharge outlet at its forward end, and the interior of the nozzle is connected to a first liquid reactant supply port; and (2) a second nozzle which is arranged in a fixed concentric position within the chamber of the first nozzle, and the second nozzle extends coaxially from the rear section of the first nozzle chamber where it is connected to a second liquid reactant supply port, to a discharge outlet at its forward end which reaches outwardly beyond the discharge outlet of the first nozzle, and wherein the outer surface of the second nozzle narrows down conically towards the forward end.

Consonant with the provision of a novel dispensing assembly, in another embodiment this invention provides a process adapted for producing free-flowing ammonium carbamate having an average particle size between about 2–10 microns, and having a purity of substantially 100 percent, which process comprises (1) injecting a pressurized stream of anhydrous liquid carbon dioxide into a moisture-free environment, wherein adiabatic expansion decreases the temperature of the liquid carbon dioxide into the range between about 10° F. and −110° F.; and (2) contacting the adiabatically expanding carbon dioxide with a stream of anhydrous liquid ammonia to form particulate ammonium carbamate, wherein the molar ratio of carbon dioxide to ammonia in the contacting zone is between about 1.5–5:1, and the temperature in the contacting zone is maintained in the range between about 70° F. and 120° F.

By the term "free-flowing" is meant a generally granular or pulverulent material which under normal testing conditions will have an angle of repose between about 30° and 45°. (Robert H. Perry et al, Ed., Chemical Engineer's Handbook, 5th Ed., 7-4, 1973).

Figure 2:
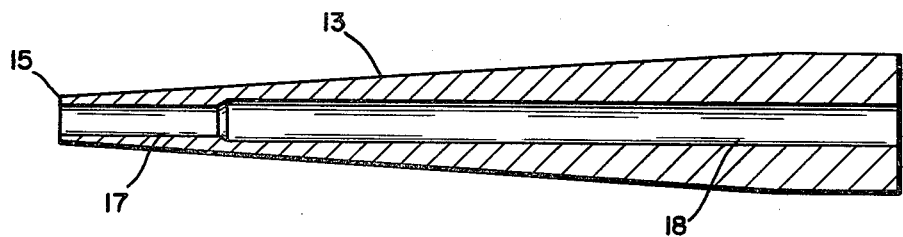

This invention shall be described more specifically with reference to the accompanying drawing, in which FIG. 1 is a side elevation of a dipensing assembly in accordance with the present invention; and FIG. 2 is a longitudinal sectional view of the inner nozzle of an invention dispensing assembly, which view illustrates an embodiment in which the inner nozzle has a smaller interior cross-section toward the forward end than it does toward the rear end.

Referring to FIG. 1, Dispensing Assembly 10 is adapted to receive a supply of pressurized liquid carbon dioxide through Line 11, and a supply of pressurized liquid ammonia through Line 12 and inner Nozzle 13. The liquid carbon dioxide exits through Discharge Outlet 14, and the liquid ammonia exits through Discharge Outlet 15. The carbon dioxide and ammonia interact in Contacting Zone 16 to produce particulate ammonium carbamate.

Illustrative of the practice of the present invention, the liquid carbon dioxide supply is filtered and dried by refrigerated filtration employing an activated filter, e.g. one containing a molecular sieve and activated alumina such as Dri-Cor Filter-Drier H-163 (Henry Valve Co., Melrose Park, Ill.). The filtration ensures that the carbon dioxide is anhydrous, thereby preventing ice formation and line blockage. Also, the presence of water in the reaction system causes the formation of ammonium carbonate or ammonium bicarbonate byproduct which results in a lower yield of less pure ammonium carbamate.

For the same reasons, the liquid ammonia is also subjected to refrigerated filtration to ensure that the supply to the dispensing assembly is anhydrous.

Each of the liquid carbon dioxide and liquid ammonia feed systems is equipped with refrigeration and metering means. For example, the lines are supercooled, and the feed rates are controlled by flow transducers.

In a typical continuous operation designed to produce 600 pounds per hour of ammonium carbamate (at greater than 80 percent yield based on ammonia feed), liquid carbon dioxide at a temperature of about 0° F. and a pressure of about 300 psig is passed through Line 11 into the first nozzle chamber and is ejected out of Discharge Outlet 14 into Contacting Zone 16.

During the passage Discharge the carbon dioxide through the first nozzle chamber toward Dischrge Outlet 14, the linear increasing chamber volume causes an adiabatic expansion of the liquid carbon dioxide. The temperature of the liquid carbon dioxide decreases from 0° F. to about −110° F. over the distance between its entrance into the first nozzle chamber and its exit through Discharge Outlet 14. The carbon dioxide stream exits into Contacting Zone 16 in the form of a diverging cone.

During the flow and ejection of the liquid carbon dioxide feed from the first nozzle Discharge Outlet 14, simultaneously liquid ammonia at a temperature of about 0° F. and a pressure of about 120 psig is passed through line 12 and inner Nozzle 13 and is ejected out of Discharge Outlet 15 into Contacting Zone 16.

The ejecting stream of ammonia causes an area of turbulence in the diverging cone of carbon dioxide, and the turbulence effectively admixes the contacting carbon dioxide and ammonia reactants. The reactants on contact form substantially 100 percent pure solid ammonium carbamate having an average particle size of about 6–7 microns.

The feed rate molar ratio of carbon dioxide to ammonia is about 4:1. The large excess of carbon dioxide (at −110° F.) is essential as a means for controlling the temperature in Contacting Zone 16 within the range between about 90°–100° F. The formation of ammonium carbamate is highly exothermic. The approximate heat of formation from carbon dioxide and ammonia as described above is about 876 Btu/pound. The said supercooled carbon dioxide quenches the exothermic heat of formation, and the temperature in Contacting Zone 16 is maintained at a sufficiently low temperature to prevent decomposition of the formed ammonium carbamate product.

It is advantageous to employ a dispensing assembly in which the inner Nozzle 13 has a passage which narrows in diameter toward the Discharge Outlet 15. As illustrated in FIG. 2, the forward section 17 has a smaller cross-section than does the rear section 18. This constriction prevents a pressure drop in the liquid ammonia system during the operation of the dispensing assembly for the production of ammonium carbamate.

Further, in order to obtain ammonium carbamate of substantially 100 percent purity, it is essential that the Contacting Zone 16 is moisture-free. A moisture-free environment preferably is accomplished by the use of an elongated vessel which is a closed system with respect to the surrounding ambient conditions. Means are provided near the top of the vessel for drawing off the unreacted carbon dioxide and ammonia gases. Means are provided near the bottom of the vessel for collecting and removing the fine powder form of the ammonium carbamate product.

Among its uses, the free-flowing high purity ammonium carbamate powder so produced has exceptional properties for the purpose of expanding tobacco to increase its filling capacity.

What is claimed is:

1. A process adapted for producing free-flowing ammonium carbamate having an average particle size between about 2–10 microns, and having a purity of substantially 100 percent, which process comprises (1) injecting a pressurized stream of anhydrous liquid carbon dioxide into a moisture-free environment, wherein adiabatic expansion decreases the temperature of the carbon dioxide into the range between about 10° F. and −110° F.; and (2) contacting the adiabatically expanding carbon dioxide with a stream of anhydrous liquid ammonia to form particualate ammonium carbamate, wherein the molar ratio of carbon dioxide to ammonia in the contacting zone is between about 1.5–5:1, and the temperature in the contacting zone is maintained in the range between about 70° F. and 120° F., and wherein said liquid ammonia is injected into the approximate center of said stream of carbon dioxide in order to increase mixing.

2. A process in accordance with claim 1 wherein the liquid carbon dioxide is at an initial pressure between about 200–350 psig, and is at an initial temperature between about −20° F. and 20° F.

3. A process in accordance with claim 1 wherein the liquid ammonia is at an initial pressure between about 90–150 psig, and is at an initial temperature between about −20° F. and 20° F.

* * * * *